United States Patent [19]

Houle

[11] Patent Number: 4,971,510

[45] Date of Patent: Nov. 20, 1990

[54] WHEELCHAIR PASSENGER DEVICE

[75] Inventor: Lionel C. Houle, Burnaby, Canada

[73] Assignee: Houle Handi-Lift Manufacturing Ltd., Burnaby, Canada

[21] Appl. No.: 293,103

[22] Filed: Jan. 3, 1989

[51] Int. Cl.$^5$ .............................................. B60P 3/00
[52] U.S. Cl. .................................... 414/546; 414/537; 414/917; 414/921; 296/190; 180/326; 180/89.13; 182/2
[58] Field of Search ............... 414/495, 546, 700, 708, 414/921, 917, 680, ; 244/137.1, 137.2; 180/326, 327, 329, 89.13; 296/190; 187/9 R; 182/2

[56] References Cited

U.S. PATENT DOCUMENTS

| 3,419,164 | 12/1968 | O'Neill | 244/137.2 X |
| 3,524,563 | 8/1970 | McCartney et al. | 414/495 |
| 3,983,960 | 10/1976 | Sikli | 187/18 |
| 4,113,065 | 9/1978 | Sikli | 187/18 |
| 4,194,723 | 3/1980 | Grove et al. | 254/9 C 9 |
| 4,457,554 | 7/1984 | Fuisz et al. | 244/137.1 X |

FOREIGN PATENT DOCUMENTS

| 974899 | 9/1975 | Canada . | |
| 1095462 | 2/1981 | Canada | 414/921 |
| 1114316 | 12/1981 | Canada . | |
| 3027301 | 3/1982 | Fed. Rep. of Germany | 244/137.1 |
| 3514581 | 2/1987 | Fed. Rep. of Germany | 244/137.1 |
| 1509522 | 5/1978 | United Kingdom | 187/9 R |
| 8504387 | 10/1985 | World Int. Prop. O. | 244/137.1 |

OTHER PUBLICATIONS

"Mobile Lounge", Air Traffic Handling System, Apr. 1972, pp. 1 and 2, 244/137.2.

Primary Examiner—H. Grant Skaggs
Assistant Examiner—Keith L. Dixon
Attorney, Agent, or Firm—Sixbey, Friedman, Leedom & Ferguson

[57] ABSTRACT

A device for transporting and for carrying from one elevation to another, persons in wheelchairs or persons otherwise requiring assistance. The device comprises a frame supported on wheels, an engine supported on the frame to drive the wheels and a steering mechanism to turn the wheels for manoeuvering the frame. The frame supports a cab which is vertically movable with respect thereto. The cab has a space within to hold at least one person and has doors on its front. Movable support members connect the cab to the frame, and are operable to move the cab from the level of the frame to a position elevated with respect to the frame. A platform is outwardly extendable from the cab forwardly from the bottom of the doors to provide a bridge between the cab and another location, to support a person being moved from the cab to such other location. A leveling system is provided to maintain a floor of the cab and the platform in horizontal orientation while the cab is moved to the elevated positon. A hydraulic device is also preferably provided to move the movable support members to cause the cab to move between its base level to the elevated position.

10 Claims, 2 Drawing Sheets

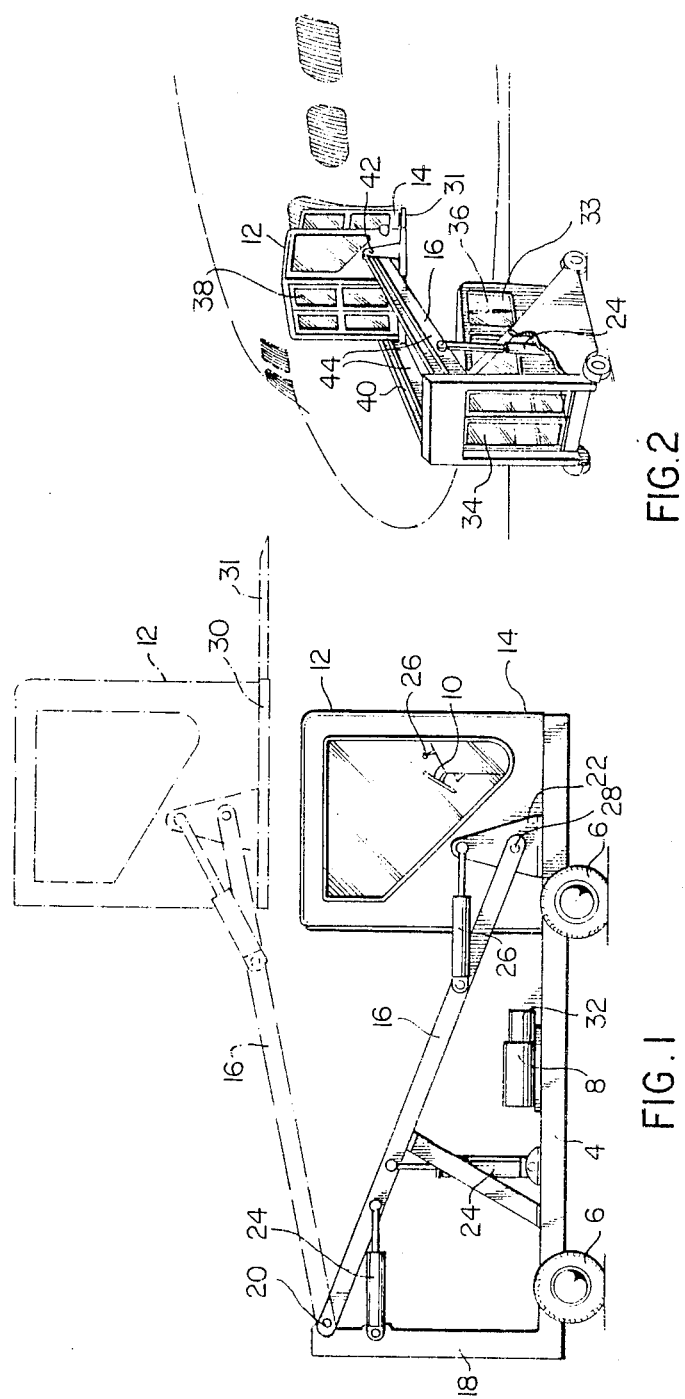

WHEELCHAIR PASSENGER DEVICE

BACKGROUND OF THE INVENTION

The present invention relates to a self-propelled device for transporting and for carrying persons in wheelchairs or otherwise requiring assistance from one elevation to another. The present invention has particular application in loading and offloading airplane passengers in wheelchairs.

At major airports, for large aircraft, wheelchair passengers are accommodated through jetways leading to the aircraft off the passenger lounges.

There is yet however no suitable facility for boarding and off-loading wheelchair passengers on commuter-type aircraft at such airports, or for any aircraft at smaller airports. In these cases, wheelchair passengers are boarded in one of the following manners:

(1) rolling the wheelchair to the side of the aircraft and carrying the passenger up the steps and into the aircraft;
(2) placing the wheelchair and passenger on a pallet and elevating with a forklift; or
(3) placing the wheelchair and passenger in a "galley supply vehicle", a type of truck with an elevating mechanism.

Such methods not only lack dignity for the wheelchair passenger, but also it may be frightening and hazardous to such passenger. In the case of the forklift method, it is hazardous to the aircraft itself.

A satisfactory solution for this problem of boarding wheelchair and other passengers needing assistance, in smaller airports and on commuter-type aircraft at any airport, would be desirable. One such alternative solution is described and illustrated in my co-pending Canadian Application Serial No. 572,590 filed July 20, 1988. In that case, a cab for lifting or lowering such persons is secured to a mobile scissors-lift apparatus.

OBJECTS OF THE INVENTION

It is an object of the present invention to provide an alternative construction of self-propelled device which will comfortably and with safety transport and carry from one elevation to another, persons in wheelchairs or otherwise requiring assistance.

A further object of the present invention is to provide such a device which is particularly well-suited to function at airports for transporting airplane passengers in wheelchairs or otherwise requiring assistance from and to an aircraft, where jetways may not be available or suitable.

It is a further object of the present invention to provide such a device which will be relatively economical in cost and therefore usable in smaller airports with light passenger traffic.

SUMMARY OF THE INVENTION

In accordance with the present invention there is provided a device for transporting and for carrying from one elevation to another persons in wheelchairs or persons otherwise requiring assistance. The device comprises a frame supported on wheels, engine means supported on the frame to drive the wheels and steering means to turn the wheels for manoeuvering the frame. The frame supports a cab which is vertically movable with respect thereto. The cab has a space within to hold at least one person and has door means on its front to enable that person to enter or leave the cab. Movable support means connect the cab to the frame, the support means being operable to move the cab from the a base position at the level of the frame to a position elevated with respect thereto. A platform is outwardly extendable from the cab forwardly from the bottom of the door means to provide a bridge between the cab and another location, to support a person being moved from the cab to such other location. Means are provided to maintain a floor of the cab and the platform in horizontal orientation when the cab is moved to said elevated position. Means are also provided to move the movable support means to cause the cab to move between its base level to said elevated position.

In an alternative, preferred embodiment, an elongated compartment is supported on the frame immediately adjacent the cab when the cab is in its base position. The compartment has doors at its opposite ends and a space within the compartment to hold a plurality of persons in wheelchairs or persons otherwise requiring assistance, and an operator. The cab has further door means in its back adjoining the compartment door means, when the cab is in said base position.

The device in accordance with the present invention provides an economical, effective and safe means for boarding wheelchair passengers or other passengers requiring assistance on commuter-type aircraft or on any other aircraft at small airports where jetways are not available.

BRIEF DESCRIPTION OF THE DRAWINGS

These and other objects and advantages of the invention will become apparent upon reading the following detailed description and upon referring to the drawings in which:

FIG. 1 is an elevation view of an example embodiment of a self-propelled passenger transporting and elevating device in accordance with the present invention;

FIG. 2 is a perspective view of an alternative embodiment of self-propelled passenger transporting and elevating device in accordance with the present invention;

Figure 3:
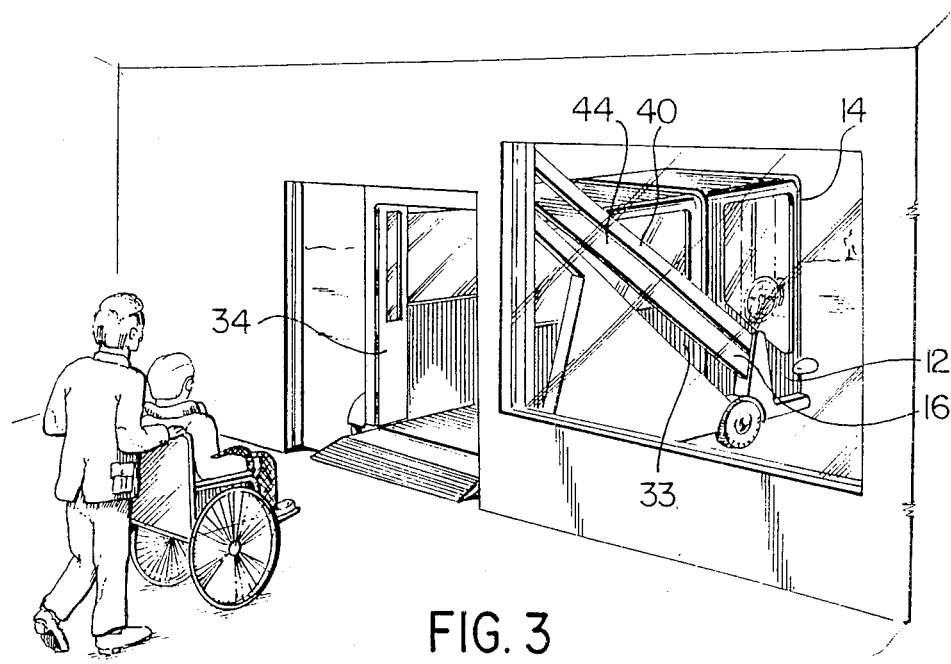
FIG. 3 is a perspective view of the device of FIG. 2 being loaded at ground level, for example a terminal exit.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Turning to the drawings, there is illustrated in FIG. 1 an example embodiment of a self-propelled device 2 for transporting and for carrying from one elevation to another persons in wheelchairs or otherwise requiring assistance in accordance with the present invention. Device comprises a frame 4 mounted on wheels 6, with an appropriate engine means 8, for example electric or gas driven, to power the wheels, and steering means 10 for causing the wheels to turn for appropriate manoeuvering frame 4. Supported on frame 4 is an elevating cab 12 having a front door 14 for loading and unloading thereof. Cab 12 has sufficient space within preferably to carry or elevate one wheelchair passenger or three foot passengers "requiring assistance". Cab 12 is supported by means of a pair of spaced, parallel elevating beams 16, one end of each of which beam is secured to one of posts 18 of frame 4 at pivots 20, so that these beams pivot about the same horizontal axis through pivots 20. The other ends of elevating beams 16 are pivotally secured to cab support brace 22 secured to cab 12. Hydraulic cylinder means 24, preferably operable through control means 26 in cab 12, cause elevating beams to be upwardly pivoted about pivots 20, from base position as illustrated in FIG. 1 to an elevated aircraft loading or unloading position (phantom, FIG. 1). In this manner, cab 12 may be raised and lowered. One or more pneumatic sleeve actuators 26 are secured at one end to beams 16, with the other end secured to portions of support braces 22, as illustrated, to cause cab 12 to pivot as required about pivot 28, so that the floor 30 of cab 12 remains in horizontal position as cab 12 is moved in arcuate fashion between base and elevated positions. It is preferred that an outwardly extending ramp means 31 be provided from the front of the bottom of cab 12, to provide a bridge between platform 30 of cab 12 and for example the doorsill of an aircraft, so that a passenger within cab 12 may be easily moved into the aircraft or vice versa. Ramp means 31 is preferably extendable and retractable automatically, for example by pneumatic means, by an appropriate control (not illustrated). It is further preferred that pivots 20 for elevating beams 16 be positioned at a height which is approximately midway between the lower or base position of pivot 28 at the opposite end of beam 16, and the normal elevated position thereof for loading and unloading passengers for example into or from an aircraft.

It is preferred that whenever cab 12 has been raised above its normal base level of FIG. 1, an automatic control means 32 for motor 8 be provided so that the movement of frame 4 is significantly restricted, thereby permitting frame 4 and cab 12 to be "inched" into position on the doorsill of an aircraft. It will be understood that cab 12 would be entered while the cab is at its base, ground level. Device would then be driven to the side of the aircraft, hydraulically elevated and inched into position onto the doorsill of the aircraft for unloading of the passenger. The reverse procedure would be followed for disembarking passengers from an aircraft.

Figure 4:
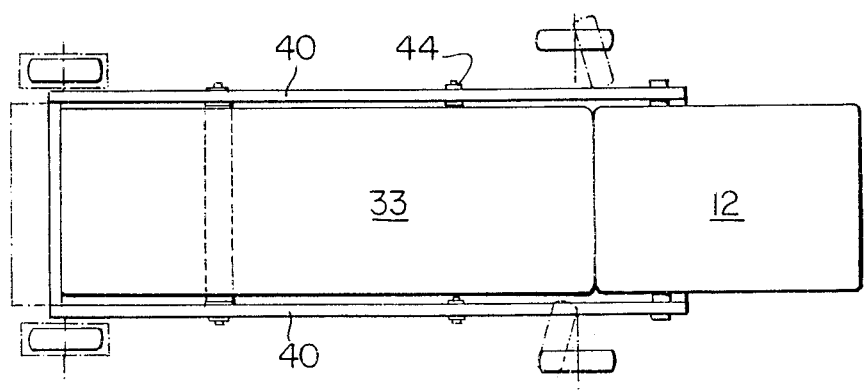
FIG. 4 is a plan view from above of the device of FIGS. 2 and 3.

Turning to the alternative embodiment illustrated in FIGS. 2, 3 and 4, a device similar to that of FIG. 1 is described and illustrated with the exception that there is additionally provided a non-elevating, elongated holding compartment 33. Access thereto is provided through rear doors 34 at ground or base level. It is also provided with front doors 36 on its other side. Compartment 33 is preferably spacious enough to carry two additional wheelchair passengers plus four or five foot passengers, or alternatively eight or ten foot passengers or any comparable combination of the two. Additionally, cab 12 is provided with rear doors 38. Cab 12 and compartment 33 are immediately adjacent each other when cab 12 is in its base position (FIG. 3), with doors 36 of compartment 33 and doors 38 of cab 12, when both open, permitting passage between cab 12 and compartment 33. Appropriate control means, for example hydraulic or electronic, are provided for selectively opening and closing these doors as required. It is preferred, in this embodiment, that all the control functions, including those for steering and driving the device, opening and closing the doors and elevating and lowering cab 12, be located in compartment 33.

As in the embodiment of FIG. 1, elevating beams 16 are preferably hydraulically elevated and lowered. An alternative levelling system for cab 12 is provided however, to ensure that its platform 30 and ramp 31 are maintained in appropriate, presumably horizontal positioning. In this case, instead of a slave actuator 26, there is provided a paralleling beam 40 spaced from each of elevating beams 16, one end of each paralleling beam being pivotally secured to post 18 above elevating beam 16, and the other end of which is pivotally secured a similar distance above the other end of elevating beam 16, to support brace 22 at pivot 42. Links 44 join corresponding beams 16 and 40 as illustrated to provide mutual support for these beams. The elevating and lowering of cab 12 of the device of FIGS. 2, 3 and 4 is similar to that of FIG. 1. Persons carried in compartment 33 may be placed in cab 12, by opening adjoining doors 36 and 38, and then with cab doors 38 and 14 closed, elevated to airplane entrance door level by elevating cab 12. With doors 14 then open, and ramp means 31 extended to the door sill of the airplane, the passenger in cab 12 may be easily loaded onto the plane. For off-loading such passengers, a reverse sequence would be followed.

Preferably hydraulic cylinders 24 are used for movement of beams 16 and 40. It will be understood that, because of the location of pivot 20 for beams 16 in the embodiments of FIGS. 2, 3 and 4, as cab 12 is raised from its base position as illustrated in FIG. 3, there will be a slight upward and outward movement with respect to compartment 33 as cab 12 follows it arcuate path upward, thereby ensuring that cab 12 clears the adjacent side portion of compartment 33.

Thus, it is apparent that there has been provided in accordance with the present invention a device for transporting and for carrying from one elevation to another persons in wheelchairs or persons otherwise requiring assistance that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A device for transporting and for carrying persons in wheelchairs or persons otherwise requiring assistance from a substantially ground level elevation to a raised elevation, the device comprising a frame supported on a plurality of wheels, engine means supported on the frame to drive at least one of said wheels, steering means to turn at least one of said wheels for maneuvering the frame, the frame supporting a cab which is vertically movable with respect thereto, and movable support means connected between said cab and said frame for moving said cab between the ground level elevation and a raised elevation, said frame further including a holding compartment connected to said frame that is fixed with respect to said frame in the elevational direction, said holding compartment is positioned on said frame to be adjacent said cab when said cab is at the ground level elevation but permitting raising of the cab without obstruction, said holding compartment having door means at two sides thereof and said cab having a door means adjoining one of the compartment door means and another door means at another side for persons to load or unload from the cab at a raised elevation, wherein said holding compartment is of a size sufficient to hold a plurality of persons occupying wheelchairs while said cab is of a smaller size than said holding compartment to raise or lower persons in wheelchairs between a raised elevation and said holding compartment.

2. A device according to claim 1 wherein said movable support means comprises an elevating beam means one end of which is pivotally secured to the frame and the other end of which supports the cab.

3. A device according to claim 2 further provided with means to selectively open and closed the holding compartment and cab door means.

4. A device according to claim 3 wherein all of said means to control the operation of the device are operable from the holding compartment.

5. A device according to claim 2 wherein said elevating beam means comprises a pair of spaced parallel bars, corresponding end therof secured to the cab and the other ends secured to the frame at a height approximately mid-way between the uppermost and lowermost positions of the opposite ends of the bars, whereby the cab is raised and lowered along the path of an arc.

6. A device according to claim 2 further including means to maintain the cab in horizontal orientation when said cab is moved to the raised elevation comprising a pair of paralleling beams adjacent to and operable in conjunction with said elevating beam means, corresponding ends of said paralleling beams being secured to the frame to pivot about a horizontal axis and the other ends of the paralleling beams being appropriately pivotably secured to a portion of the cab.

7. A device according to claim 6 further including means to move said movable support means which comprises hydraulic means.

8. A device according to claim 6 wherein control means are provided for the engine means to drive the wheels so that the wheels may be driven only at a significantly reduced speed when the cab has been elevated above its base position.

9. A device according to claim 2 further including means to move said movable support means which comprises hydraulic means.

10. A device according to claim 2 wherein control means are provided for the engine means to drive the wheels so that the wheels may be driven only at a significantly reduced speed when the cab has been elevated above its base position.

* * * * *